United States Patent [19]

Nao et al.

[11] Patent Number: 5,065,078
[45] Date of Patent: Nov. 12, 1991

[54] D.C. MOTOR CONTROL CIRCUIT FOR RADIO CONTROLLED TOY

[75] Inventors: Yuji Nao, Kawasaki; Koichi Yamazaki, Tokyo, both of Japan

[73] Assignee: Rohm Co., Ltd., Kyoto, Japan

[21] Appl. No.: 449,805

[22] Filed: Dec. 13, 1989

[30] Foreign Application Priority Data

Dec. 19, 1988 [JP] Japan ............................ 63-164313[U]

[51] Int. Cl.$^5$ ............................................. H02P 7/00
[52] U.S. Cl. ...................................... 318/16; 388/829; 340/825.63
[58] Field of Search ................... 318/16; 388/825-827, 388/829, 831, 915; 340/825.57, 825.63, 825.69

[56] References Cited

U.S. PATENT DOCUMENTS

| | | | |
|---|---|---|---|
| 3,856,104 | 12/1974 | Ohba | 318/16 X |
| 3,858,116 | 12/1974 | Friedl et al. | 318/16 X |
| 4,045,715 | 8/1977 | Umpleby et al. | 318/16 |
| 4,143,307 | 3/1979 | Hansen et al. | 318/16 |
| 4,275,394 | 6/1981 | Mabuchi et al. | 318/16 X |
| 4,295,082 | 10/1981 | Moto et al. | 318/672 X |
| 4,309,645 | 1/1982 | De Villeneave | 318/829 |
| 4,334,221 | 6/1982 | Rosenhagen et al. | 340/825.69 |
| 4,360,808 | 11/1982 | Smith, III et al. | 318/16 X |
| 4,424,470 | 1/1984 | Finch | 318/6 |

Primary Examiner—William M. Shoop, Jr.
Assistant Examiner—David S. Martin
Attorney, Agent, or Firm—Fay, Sharpe, Beall, Fagan, Minnich & McKee

[57] ABSTRACT

A control circuit for a DC motor which drives a radio controlled toy. The control circuit receives a signal whose pulse width contains information relating to the desired speed and direction in which the motor is to turn. If the pulse width is greater than a predetermined value, the control signal will be generated which causes the motor to turn in a forward direction, and if the pulse width is less than the predetermined value a control signal will be generated which causes the motor to turn in a reverse direction. The pulse width is also converted to a voltage level which is compared to a ramp wave with a frequency which is higher than the frequency of the received signal. The output of the comparator is a signal with a frequency which is higher than that of the received signal, allowing precise control of the motor in overcoming inertial forces applied against it.

21 Claims, 3 Drawing Sheets

D.C. MOTOR CONTROL CIRCUIT FOR RADIO CONTROLLED TOY

FIELD OF THE INVENTION

The present invention relates to a D.C. motor control circuit for a radio-controlled toy and, particularly, to an improvement of a D.C. motor control circuit for smoothly driving a radio controlled toy such as toy automobile or toy robot.

BACKGROUND OF THE INVENTION

In a conventional radio controlled toy, a carrier signal having frequency of around 27 MHz or around 40 MHz is generated by a transmitter. This carrier is modulated with a control pulse signal having frequency of around 50 Hz and the modulated carrier is transmitted to a receiver of a toy. The receiver demodulates the modulated carrier to produce a motor control pulse having the same frequency as that of the control signal and whose width may be larger than that of the control pulse signal. A motor of the toy is driven by the motor control pulse.

In detail, motor control for a toy such as an automobile includes a forward drive control, a backward drive control and a stop control. Therefore, the control pulse signal contains information concerning these controls. It has been usual that this information is contained in the control pulse signal as a difference in pulse width so that the receiver can detect either of them by comparing a trailing edge of the pulse with a trailing edge of a reference pulse which may be produced by any suitable means in synchronism with the control pulse signal. That is, the forward drive is detected when the trailing edge of the received control pulse signal is, for example, delayed from the trailing edge of the reference pulse; the backward drive can be detected when the trailing edge of the control pulse advances the trailing edge of the reference pulse and the stop instruction can be detected when the both trailing edges are coincident.

The steering control signal in the form of a pulse is also included in the control pulse signal. Therefore, the pulse width of the motor control signal and/or the steering control signal which is transmitted with an interval of about 20 msec. can not be made large enough to actually drive the D.C. motor which drives a movable member having a relatively large moment of inertia. Thus, the motor control pulse having a pulse width large enough to drive the motor is produced in the receiver side and corresponds to the motor control pulse signal and used to drive the motor.

On the other hand, in order to precisely drive the motor associated with the member having large moment of inertia, the pulse width of the motor control pulse should be made smaller. This means that the interval between a trailing edge of a pulse and a leading edge of a next pulse becomes large. Therefore, the motor can not keep its driven state by the former pulse until the next pulse due to the large momemt of inertia applied thereto.

OBJECT OF THE INVENTION

An object of the present invention is to provide a D.C. motor control circuit capable of precisely driving a D.C. motor of a radio controlled toy.

Another object of the present invention is to provide a D.C. motor control circuit capable of smoothly driving a D.C. motor of a radio controlled toy.

A further object of the present invention is to provide a D.C. motor control circuit capable of controlling a D.C. motor efficiently.

Another object of the present invention is to provide a D.C. motor control circuit which realizes a smooth and precise driving of a D.C. motor with a minimum addition of circuit element to a conventional control circuit.

SUMMARY OF THE INVENTION

According to the present invention, these objects can be achieved by a provision of a D.C. motor control circuit comprising a first motor control circuit including a receiving circuit for receiving a radio control signal and deriving a control pulse therefrom and a first motor control pulse generating circuit responsive to an output of the receiving circuit for producing a first motor control pulse having the same frequency as and a width larger than those of the output signal of the receiving circuit in synchronism with the control pulse, and a second motor control pulse generating circuit. The second motor control pulse generator responds to the first motor control pulse generated by the first motor control pulse generator and produces a second motor control pulse having frequency much higher than that of the first motor control pulse and width smaller than that of the first motor control pulse in synchronism with the first motor control pulse. A D.C. motor is driven by the second motor control pulse.

In the present invention, the width of the first motor control pulse may become small and an idle time between adjacent pulses becomes large correspondingly when it is desired to drive the toy precisely. However, since the second motor control pulse is high frequency and a number of pulses are produced, such idle time is considerably shortened. Therefore, the D.C. motor is supplied with these pulses with minimum intervals and can be driven continuously even if the pulse width is small so that it may overcome the inertia of the toy.

DETAILED DESCRIPTION OF THE PREFERRED EMBODIMENTS

Figure 1:
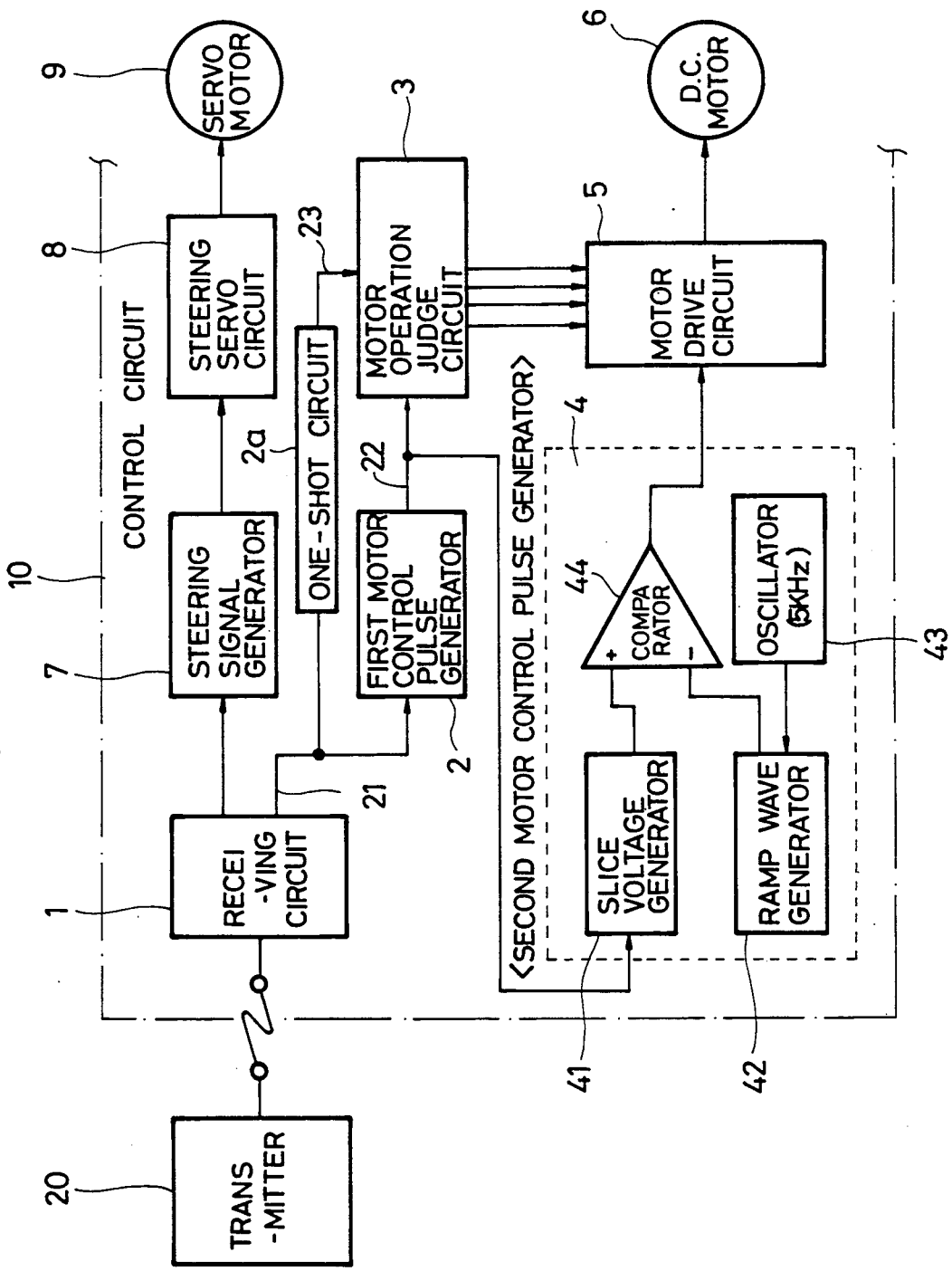
FIG. 1 is a block circuit diagram of an embodiment of a D.C. motor control circuit according to the present invention.

In FIG. 1, a control circuit 10 for radio controlled toy includes a receiving circuit 1. The receiving circuit 1 includes a detector and a decoder, for detecting a control signal which is a carrier modulated with a motor control signal and a steering signal both of which have a frequency of around 50 Hz and was transmitted by a transmitter 20 and demodulating it to obtain the control signals contained therein. The motor control signal thus demodulated is supplied to a first motor control pulse generator 2 and to a one-shot circuit 2a which has an output connected to a motor operation judging circuit 3 and the steering control signal is supplied to a steering signal generator 7.

The one-shot circuit 2a responds to the motor control signal to produce a reference pulse in synchronism therewith. The reference pulse has a fixed width. Alternatively, it is possible to generate such a reference pulse by other means than the one-shot circuit 2a. In such a case, the connection from the output of the receiving circuit 1 through the one-shot circuit 2a to the motor operation judging circuit 3 may be removed. Circuit 3, for example, can constitute a decoder which generates and reference pulse according to an output of the generator 2.

Construction and operation of a steering system including the steering signal generator 7, a steering servo circuit 8 connected to an output of the steering signal generator and a servo motor 9 may be conventional and therefore not decribed in this specification.

The first motor control pulse generator 2 responds to the motor control signal from the receiving circuit 1 to produce a first motor control pulse signal having the same frequency as that of the motor control signal which is of about 50 Hz and has a width larger than that of the motor control signal.

As in the conventional system, information, contained in the control signal is represented by the pulse width thereof. That is, for example, forward drive information may be represented by a width larger than a predetermined width, backward drive information may be repesented by smaller width and a motor stop may be instructed by the control signal having the same width as the predetermined width. Therefore, the information can be detected by comparing, for example, a trailing edge of the first motor control pulse with a trailing edge of the reference pulse having the fixed width. A result of judgement is supplied to a motor drive circuit 5.

A reference numeral 4 shows a second motor control pulse generator which comprises a slice voltage generator 41, a ramp wave generator 42, a 5 KHz oscillator 43 and a PWM signal generator/comparator 44. Although the construction and operation of the second motor control pulse generator 4 will be described in detail later, the second motor control pulse generator 4 is responsive to the first motor control pulse generated by the first motor control pulse generator 2 to produce a pulse signal having frequency much higher than that of the first motor control pulse. The frequency of the second motor control pulse may be, for example, 5 KHz which is supplied to the motor drive circuit 5.

The motor drive circuit 5 comprises a polarity switch-over circuit responsive to a result signal from the motor operation judge circuit 3 to switch a direction of current to be supplied by a power source (not shown) to a D.C. motor 6, a current amplifier for amplifying the second motor control pulse supplied from the second motor control pulse generator 4, a voltage step-up circuit for stepping-up voltage of the second motor control pulse and a switch circuit. When the judge result shows, for example, a forward drive, the polarity switch-over circuit switches the polarity of the power source such that the D.C. motor 6 is driven forwardly and the second motor control pulse is used as a gate signal for the switch circuit to ON/OFF control current supplied to the D.C. motor 6. For a judge result showing a backward drive, the operation is the same as that for the forward drive except that the power source polarity is changed. For a motor stop, the switch-over circuit of the motor drive circuit 5 becomes neutral, disconnecting the power source.

For the steering system, the steering signal generator 7 picks up a steering control signal from the output of the receiving circuit 1 and produces a drive signal for steering. The steering servo circuit 8 responds to the drive signal from the steering signal generator 7 to generate a steering angle control signal by which the servo motor 9 is driven.

The timing relation between the control signal from the receiving circuit, the first motor control pulse, the reference pulse and the second motor control pulse briefly mentioned previously will be described in more detail with reference to FIGS. 2a to 2e, FIGS. 3 and 3b and FIGS. 4a and 4b.

The motor control signal 21 (FIG. 2a) from the receiving circuit 1 includes pulses with a frequency of 50 Hz, therefore having a period of 20 ms. Since the control signal from the transmitter 20 includes not only the motor control signal 21 but also the steering control signal. and the control information depends upon the width of the pulses, the maximum width of the motor control pulse signal 21 can not always be made large enough. Therefore, the width of the pulse 21 is enlarged by the first motor control pulse generator 2, resulting in the first motor control pulse (FIG. 2b). Although the reference pulse 23 (FIG. 2c) is, in this example, produced by the one-shot circuit 2a, it can be produced by wave-shaping a synchronizing signal to be included in the motor control signal transmitted by the transmitter 20 or by using an oscillator, as mentioned previously. The width of the first motor control pulse 22 may be selected as larger than that of the reference pulse 23 as shown. As shown, leading edges and intervals of these pulses 21, 22 and 23 are coincident.

The trailing edges of the first control pulse 22 and the reference pulse 23 are compared by the motor operation judge circuit 3. For example, the forward drive is represented by the first motor control signal 22 having a width larger than that of the reference pulse 23 and the backward drive is represented by the pulse 21 having width shorter than that of the reference signal 23. When the trailing edge of the first motor control pulse 22 is delayed from that of the reference pulse 23, the motor operation judge circuit 3 produces a forward motor drive control signal 24a (FIG. 2d) and, when the trailing edge of the first motor control pulse 22 advances that of the reference pulse 23, the circuit 3 produces a backward motor drive control signal 24b (FIG. 2e). It is preferrable that the timings of generation of the forward and backward motor drive control pulses 24a and 24b are at trailing edges of shorter pulses and widths of these pulses may be the same as that of the pulse signal 21. When the widths of the first motor control pulse 22 and the reference pulse 23 are the same, the motor operation judge circuit 3 judges it as stop information and produces no signal.

Alternatively, it may be possible to eliminate the one-shot circuit 2a and supply the pulse signal 21 to the motor operation judge circuit 3 so that the pulse 21 is directly compared with the reference pulse 23. In such case, the width of the reference pulse 23 should be shorter than the maximum width of the pulse 21.

Referring to FIGS. 1, 3a and 3b, when the transmitted control signal 21 (FIG. 2a) is directly compared with the first motor control pulse 22 (FIG. 2b), the slice voltage generator 41 of the second motor control pulse generator 4 comprises a time/voltage converter or pulse width/voltage converter which converts the width (HIGH level time) of the first control pulse 22 into a voltage level 26 (FIG. 3a) which is supplied to a plus input of the PWM signal generator/comparator 44. The ramp wave generator 42 is responsive to an oscillation signal of 5 KHz from the oscillator 43 to generate a ramp wave 25 (FIG. 3b) which is supplied to a minus input of the comparator 44.

The comparator 44 compares them to produce a second motor control pulse 27 (FIG. 3b) when the voltage level 26 is higher than the ramp wave 25. The second motor control pulse 27 is supplied to the current amplifier of the motor drive circuit 5, as mentioned previously, to control the switch of the motor drive circuit 5 to thereby control the power supply to the D.C. motor 6, so that the D.C. motor 6 is driven at 5 KHz which is much higher than the control signal frequency of 50 Hz. Therefore, the energy transmission efficiency is improved.

Figure 4:
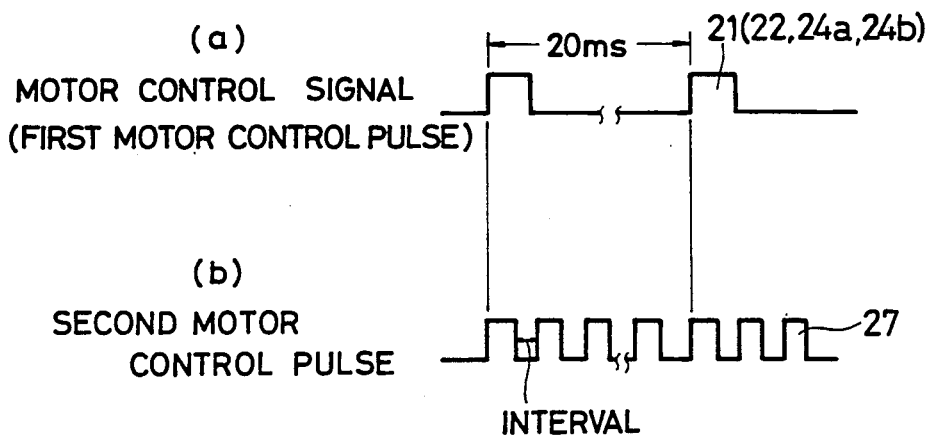
FIGS. 4a and 4b show a timing relation between the motor control signal and the second motor control pulse.

This will be described in more detail for a case where it is desired to give a precise motion to the toy. In such a case, the width of the first motor control pulse 22 is relatively small and, therefore, the idle time between adjacent pulses 22 is relatively large as shown in FIG. 4a, which is undesirable. In the present invention, however, the second motor control pulse 27 is of high frequency and has an interval which is very small compared therewith as shown in FIG. 4b. Therefore, the D.C. motor 6 can be moved precisely, overcoming an inertial force applied thereto.

It is possible to provide the first motor control circuit and the second motor control circuit as discrete devices and to make the latter control circuit detachable. In such case, it become possible to replace the second motor control circuit with another second motor control circuit having frequency other than 5 KHz. Frequency of such substitute circuit may be selected from a range from 500 Hz to 10 KHz, for a wireless control of D.C. motor.

Alternatively, the first and second motor control circuits and the motor operation judge circuits may be fabricated as a unit.

Figure 2:
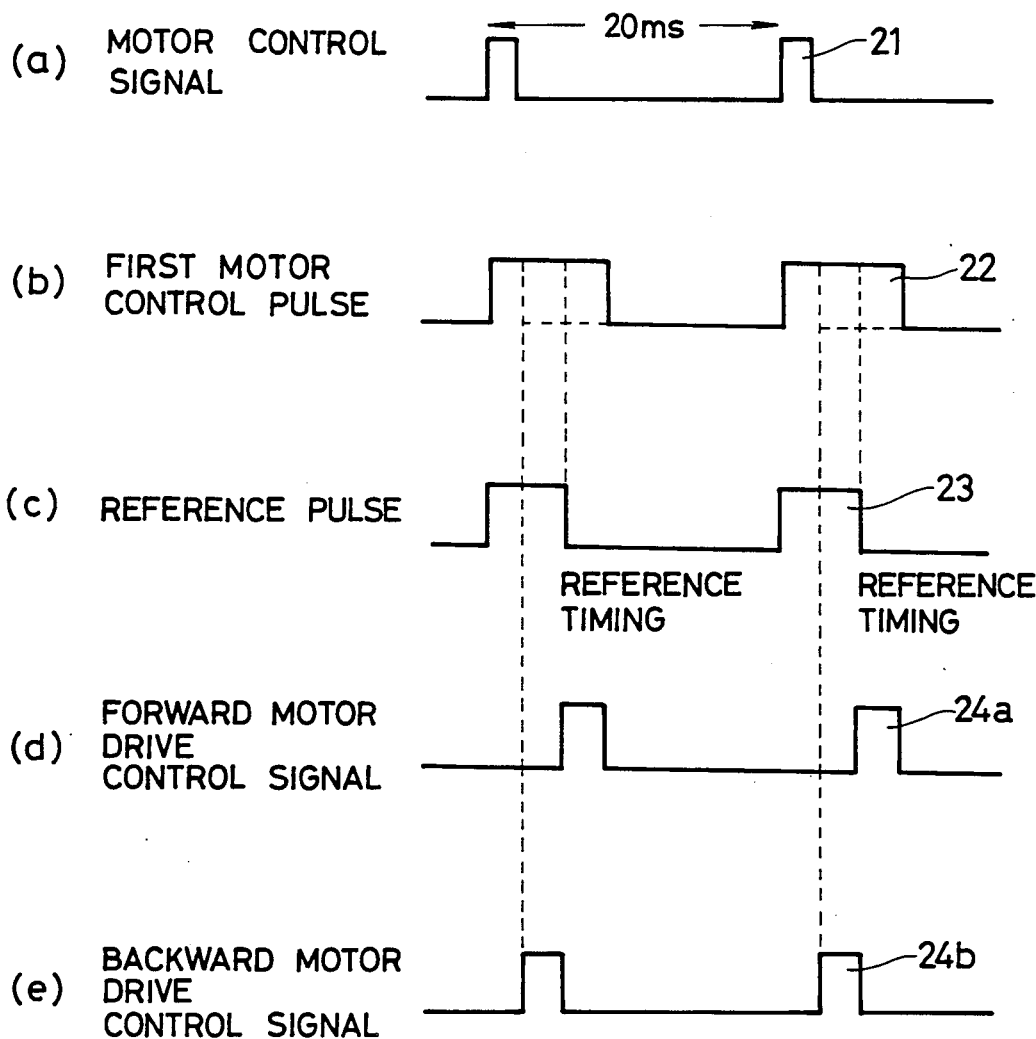
FIGS. 2a to 2e are waveforms showing relations between a motor control signal, a first control pulse, a reference pulse and motor control pulses.
Figure 3:
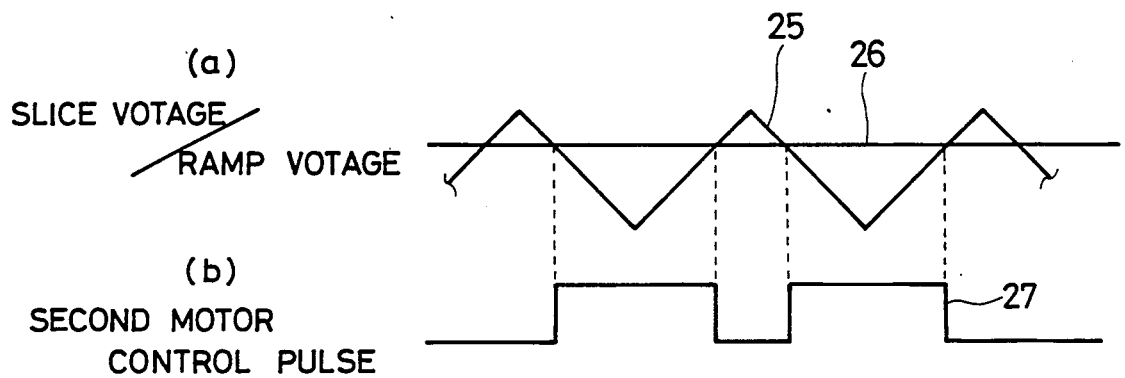
FIGS. 3a and 3b show a generation of a second control pulse.

Further, the construction of the second motor control circuit is not limited to that shown in FIG. 2. Any of other means can be used therefor so long as it produces a pulse signal having higher frequency than the first motor control pulse and a corresponding width thereto.

Additionally, it is possible to produce the forward and backward motor drive control pulses 24a and 24b by the first motor control pulse generator 2 as the first motor control pulse supplied to the second motor control pulse generator 4.

What is claimed is:

1. A control circuit for a D.C. motor for driving a radio control toy, comprising:
    a receiving circuit responsive to an input modulated motor control signal having a first frequency from a radio control transmitter and operative to demodulate the motor control signal and produce a demodulated motor control signal;
    a first motor control pulse generator for generating a first motor control pulse based on the demodulated motor control signal, said first motor control pulse having the first frequency and a first pulse width;
    a second motor control pulse generator responsive to said first motor control pulse for generating a second motor control pulse having a second frequency and a second pulse width, said second frequency being higher than said first frequency;
    a motor operation judge circuit for comparing the pulse width of said first motor control pulse with a pulse width of a reference pulse to produce a drive control signal for indicating one of a forward and a backward drive according to a result of comparison; and
    a D.C. motor drive circuit controlled by said second motor control pulse and said drive control signal which supplies forward drive current corresponding to said second motor control pulse for forward motor rotation to said D.C. motor, and supplies a backward drive current corresponding to said second motor control pulse for reverse motor rotation to said D.C. motor.

2. The control circuit as claimed in claim 1, wherein said second motor control pulse generator comprises:
    a voltage generator for generating a voltage which corresponds to the width of said first motor control pulse;
    a ramp wave generator for generating a ramp wave; and
    a comparator for comparing said ramp wave and the voltage generated by the voltage generator.

3. The control circuit as claimed in claim 1, wherein said first motor control pulse generator, said second motor control pulse generator, and said D.C. motor drive circuit are constructed as discrete devices.

4. The control circuit as claimed in claim 1, wherein said first motor control pulse generator, said second motor control pulse generator, and said D.C. motor drive circuit are constructed as discrete devices, and wherein said second motor control pulse generator is detachably connected between said first motor control pulse generator and said D.C. motor drive.

5. A control circuit for controlling the speed and direction of a motor, comprising:
    means for generating a motor control signal, said motor control signal containing speed and direction information of the motor;
    means for receiving the motor control signal and for generating a first motor control pulse having a first frequency and a first pulse width based on the received motor control signal;
    means responsive to said first motor control pulse for generating a second motor control pulse having a second pulse width and a second frequency greater than said first frequency;
    means responsive to the second motor control pulse for driving the motor in a first direction when the trailing edge of the first motor control pulse is relatively delayed compared to a reference signal pulse trailing edge; and
    means for driving the motor in a second direction when the trailing edge of the first motor control pulse is relatively undelayed compared to the reference signal pulse trailing edge.

6. A circuit for controlling the speed and direction of a motor according to claim 5, wherein the first direction is a forward direction, and wherein the second direction is a reverse direction.

7. A circuit for controlling the speed and direction of a motor, comprising:
    means for generating a signal containing speed and direction information of the motor;
    means for receiving the signal which contains speed and direction information of the motor, including means for processing a received signal into a first motor control signal which has leading edges and trailing edges defining its pulse width;

means for generating a reference signal with leading edges and trailing edges defining its pulse width;

means for comparing one of a leading edge and a trailing edge of the first motor control signal with a corresponding one of a leading edge and trailing edge of the reference signal;

means for generating a motor direction control signal for driving the motor in a forward direction based on a time occurrence of the compared edges;

means for generating a motor direction control signal for driving the motor in a reverse direction when the relative occurrence of the compared edges occurs in an opposite order than the order which causes a forward direction control signal to be generated;

means for generating a motor speed control signal; and means for driving the motor in a direction which is based on the motor direction control signal, and with a speed based on the motor speed control signal.

8. A circuit for controlling the speed and direction of a motor according to claim 7, further comprising:

means for examining the pulse width of the first motor control signal, and wherein the generated motor speed control signal is based on the pulse width of the first motor control signal.

9. A circuit for controlling the speed and direction of a motor according to claim 8, wherein the means for examining the pulse width of the first motor control signal comprises:

means for converting the pulse width of the first motor control signal to a voltage level;

means for generating a voltage ramp wave;

means for comparing the voltage of the converted pulse width to the voltage of the ramp wave.

10. A circuit for controlling the speed and direction of a motor according to claim 9, wherein the production of the speed control signal is effected when the voltage of the converted pulse width of the first signal is one of greater than and less than the voltage of the ramp wave.

11. A circuit for controlling the speed and direction of a motor according to claim 10, wherein the means for generating the motor speed control signal generates the motor speed control signal to have a frequency and pulse width which is smaller than the frequency and the pulse width of the first motor control signal.

12. A circuit for controlling the speed and direction of a motor according to claim 11, wherein the means for generating the motor direction control signal compares the trailing edges of the processed received signal with the trailing edges of the reference signal to determine what direction the motor will be rotated in.

13. A circuit for controlling the speed and direction of a motor according to claim 12, wherein when the trailing edges of the processed received signal occur at points in time after the corresponding trailing edges of the reference signal, the means for generating the motor direction control signal causes the motor to be rotated in a forward direction, and when the trailing edges of the processed received signal occur at a point in time before the corresponding trailing edges of the reference signal, the means for generating the motor direction control signal causes the motor to be rotated in a reverse direction.

14. A circuit for controlling the speed and direction of a motor, comprising:

means for generating a signal containing speed and direction information of the motor;

means for receiving the signal which contains speed and direction information of the motor, including means for processing the received signal into a first motor control signal which has leading edges and trailing edges defining its pulse width;

means for generating a reference signal with leading edges and trailing edges defining its pulse width, the leading edges of the reference signal corresponding to the leading edges of the first motor control signal, and the trailing edges of the reference signal corresponding to the trailing edges of the first motor control signal;

means for comparing one of either a leading edge or a trailing edge of the first motor control signal with one of a corresponding leading edge and trailing edge of the reference signal;

means for generating a motor direction control signal for driving the motor in a forward direction based on a time occurrence of the compared edges;

means for generating a motor direction control signal for driving the motor in reverse direction when the relative occurrence of the compared edges is in an opposite order than the order which causes a forward direction control signal to be generated;

means for generated a motor speed control signal; and means for driving the motor in a direction which is based upon the phase of the motor direction control signal, and with a speed based on the motor speed control signal.

15. A circuit for controlling the speed and direction of a motor according to claim 14, further comprising:

means for examining the pulse width of the first motor control signal, wherein the generated motor speed control signal is based on the pulse width of the first motor control signal.

16. A circuit for controlling the speed and direction of a motor according to claim 15, wherein the means for examining the pulse width of the first motor control signal comprises:

means for converting the pulse width of the first motor control signal to a voltage level;

means for generating a voltage ramp wave;

means for comparing the voltage of the converted pulse width to the voltage of the ramp wave.

17. A circuit for controlling the speed and direction of a motor according to claim 16, wherein the production of the speed control signal is effected when the voltage of the converted pulse width of the first signal is one of greater than and or less than the voltage of the ramp wave.

18. A circuit for controlling the speed and direction of a motor according to claim 17, wherein the means for generating the motor speed control signal generates the motor speed control signal to have a frequency and pulse width which is smaller than the frequency and the pulse width of the first motor control signal.

19. A circuit for controlling the speed and direction of a motor according to claim 18, wherein the means for generating the motor direction control signal compares the trailing edges of the processed received signal with the trailing edges of the reference signal to determine what direction the motor will be rotated in.

20. A circuit for controlling the speed and direction of a motor according to claim 19, wherein when the trailing edges of the processed received signal occur at points in time after the corresponding trailing edges of the reference signal, the means for generating the motor direction control signal causes the motor to be rotated in a forward direction, and when the trailing edges of the processed receive signal occur at a point in time before the corresponding trailing edges of the reference signal, the means for generating the motor direction control signal causes the motor is caused to be rotated in a reverse direction.

21. A control circuit for a D.C. motor according to claim 1, wherein the drive control signal has a phase which indicates the rotation direction of the motor.

* * * * *